(12) United States Patent
Li

(10) Patent No.: US 12,098,837 B1
(45) Date of Patent: Sep. 24, 2024

(54) LIGHTING GLOVE

(71) Applicant: Shenzhen Zhixinda Technology Co., LTD, Guangdong (CN)

(72) Inventor: Gang Li, Guangdong (CN)

(73) Assignee: Shenzhen Zhixinda Technology Co., LTD (CN)

( * ) Notice: Subject to any disclaimer, the term of this patent is extended or adjusted under 35 U.S.C. 154(b) by 0 days.

(21) Appl. No.: 18/227,521

(22) Filed: Jul. 28, 2023

(30) Foreign Application Priority Data

Mar. 30, 2023 (CN) .......................... 202320749003.X

(51) Int. Cl.
*F21V 33/00* (2006.01)
(52) U.S. Cl.
CPC ............................... *F21V 33/0008* (2013.01)
(58) Field of Classification Search
CPC ............ A41D 19/0157; F21V 33/0008; F21V 33/0004
See application file for complete search history.

(56) References Cited

U.S. PATENT DOCUMENTS

| | | | | |
|---|---|---|---|---|
| 6,592,235 | B1 * | 7/2003 | Mayo ..................... | G08B 5/0042/160 |
| 10,856,589 | B1 * | 12/2020 | Lee ........................ | A41D 13/01 |
| 11,543,107 | B1 * | 1/2023 | Guo .................... | F21V 33/0008 |
| 2010/0313335 | A1 * | 12/2010 | Waters ................. | H04N 13/2072/209.13 |
| 2016/0360817 | A1 * | 12/2016 | Lombard ............... | A42B 3/044 |
| 2017/0086521 | A1 * | 3/2017 | Sterner .................. | F21V 23/002 |
| 2018/0008150 | A1 * | 1/2018 | Hsieh ..................... | A41D 1/002 |
| 2018/0124080 | A1 * | 5/2018 | Christodorescu ..... | G06F 21/552 |
| 2020/0037685 | A1 * | 2/2020 | Graham ................ | A41D 1/002 |
| 2022/0218060 | A1 * | 7/2022 | Yamauchi ............. | A41D 27/28 |

FOREIGN PATENT DOCUMENTS

GB          2316429 A  *   2/1998   ......... A41D 19/0157

* cited by examiner

*Primary Examiner* — Fatima N Farokhrooz
(74) *Attorney, Agent, or Firm* — McDonald Hopkins LLC

(57) ABSTRACT

Provided is a lighting glove, relating to the technical field of daily supplies. The lighting glove includes a glove body, a lighting assembly, a main machine module, and a fixing support ring. The glove body includes an inner protective layer and an outer protective layer which are stacked and form a receiving space. The outer protective layer is provided with a first mounting hole and a second mounting hole. The lighting assembly is detachably mounted in the receiving space. At least part of the lighting assembly extends out of the receiving space from the first mounting hole. The main machine module is configured to supply power to the lighting assembly. The main machine module is detachably mounted in the receiving space. At least part of the main machine module extends out of the receiving space from the second mounting hole. The fixing support ring is connected to the outer protective layer and annularly disposed at the second mounting hole. The main machine module engages with the fixing support ring. According to the lighting glove, the main machine module and the lighting assembly of the lighting glove are detachable from the glove body. Thus, the glove body can be cleaned easily, and the fixing support ring ensures that the main machine module is firmly mounted.

9 Claims, 9 Drawing Sheets

LIGHTING GLOVE

TECHNICAL FIELD

The present application relates to the technical field of daily supplies and, in particular, to a lighting glove.

BACKGROUND

In carrying out fishing, maintenance, agricultural labor, and the like, people usually need to wear gloves for protection. When the preceding activities are carried out at night, a user also needs to additionally set a lighting device. Therefore, in the related art, a lighting glove is provided. A lighting assembly is fixed on the glove. The active environment is lighted by the lighting assembly on the glove, thereby improving the use experience of users. However, when the existing lighting glove is cleaned after dirt, the lighting assembly is easily damaged by water inflow, and the cleaning process is very inconvenient. Therefore, a lighting glove is urgently needed to solve the preceding problems.

SUMMARY

The object of the present application is to provide a lighting glove. The main machine module and the lighting assembly of the lighting glove are detachable from a glove body. Thus, the glove body can be cleaned easily, and a fixing support ring ensures that the main machine module is firmly mounted.

To achieve this object, the present application adopts the following solutions.

A lighting glove includes a glove body, a lighting assembly, a main machine module, and a fixing support ring.

The glove body includes an inner protective layer and an outer protective layer which are stacked and form a receiving space. The outer protective layer is provided with a first mounting hole and a second mounting hole.

The lighting assembly is detachably mounted in the receiving space. At least part of the lighting assembly extends out of the receiving space from the first mounting hole.

The main machine module is configured to supply power to the lighting assembly. The main machine module is detachably mounted in the receiving space. At least part of the main machine module extends out of the receiving space from the second mounting hole.

The fixing support ring is connected to the outer protective layer and annularly disposed at the second mounting hole. The main machine module engages with the fixing support ring.

As an optional solution, the main machine module includes a main machine housing and a power supply. The power supply is disposed in the main machine housing. A first annular recess is formed in an outer wall of the main machine housing. The fixing support ring engages in the first annular recess.

As an optional solution, the main machine module also includes a switch. The switch is electrically connected to the power supply and the lighting assembly. The switch is configured to turn on or turn off the lighting assembly.

As an optional solution, the fixing support ring is made of a leather material or a rubber material.

As an optional solution, the fixing support ring is fixed on the outer protective layer through at least one of bonding, sewing, or riveting.

As an optional solution, the outer protective layer is provided with a reinforcing portion around the first mounting hole. The lighting assembly includes a lamp housing and a lamp bead. The lamp bead is mounted on the lamp housing. The lamp housing is provided with a second annular recess. The reinforcing portion engages inside the second annular recess.

As an optional solution, the reinforcing portion is a buttonhole sewn at the first mounting hole.

As an optional solution, the glove body is provided with a hand back sleeve and at least two finger sleeves. Each of the at least two finger sleeves is provided with a first mounting hole. The second mounting hole is disposed on the hand back sleeve. Each of the at least two finger sleeves is correspondingly provided with one lighting assembly.

As an optional solution, the lighting glove also includes a wire. The lighting assembly is connected to the main machine module by the wire. The wire is disposed in the receiving space.

As an optional solution, the lighting glove also includes a wristband portion. The wristband portion is connected to the glove body and configured to annularly dispose and fix on the wrist of a user.

The wristband portion is molded with the glove body integrally or separately.

The present application has the following beneficial effects.

According to the lighting glove of the present application, the glove body is configured to protect the hand of a user. The wristband portion is annularly disposed on the wrist of the user so that the lighting glove can be prevented from being detached from the hand. The receiving space formed by the inner protective layer and the outer protective layer, the first mounting hole, and the second mounting hole cooperate. Thus, not only part of the lighting assembly and part of the main machine module can be covered and protected to improve the aesthetics of the lighting glove, but also the lighting assembly and the main machine module can be limited. Moreover, the lighting assembly and the main machine module can be detached from the glove body. Therefore, the lighting assembly and the main machine module can be detached in advance when the lighting glove needs to be cleaned so that damage of the lighting assembly and the main machine module due to water inflow is avoided, thereby improving the convenience of cleaning the lighting glove. In addition, the fixing support ring fixed at the second mounting hole engages and cooperates with the main machine module to support and limit the main machine module, thereby ensuring that the position of the main machine module does not move randomly or fall from the second mounting hole, and improving the firmness of the mounting of the main machine module.

Figure 1:
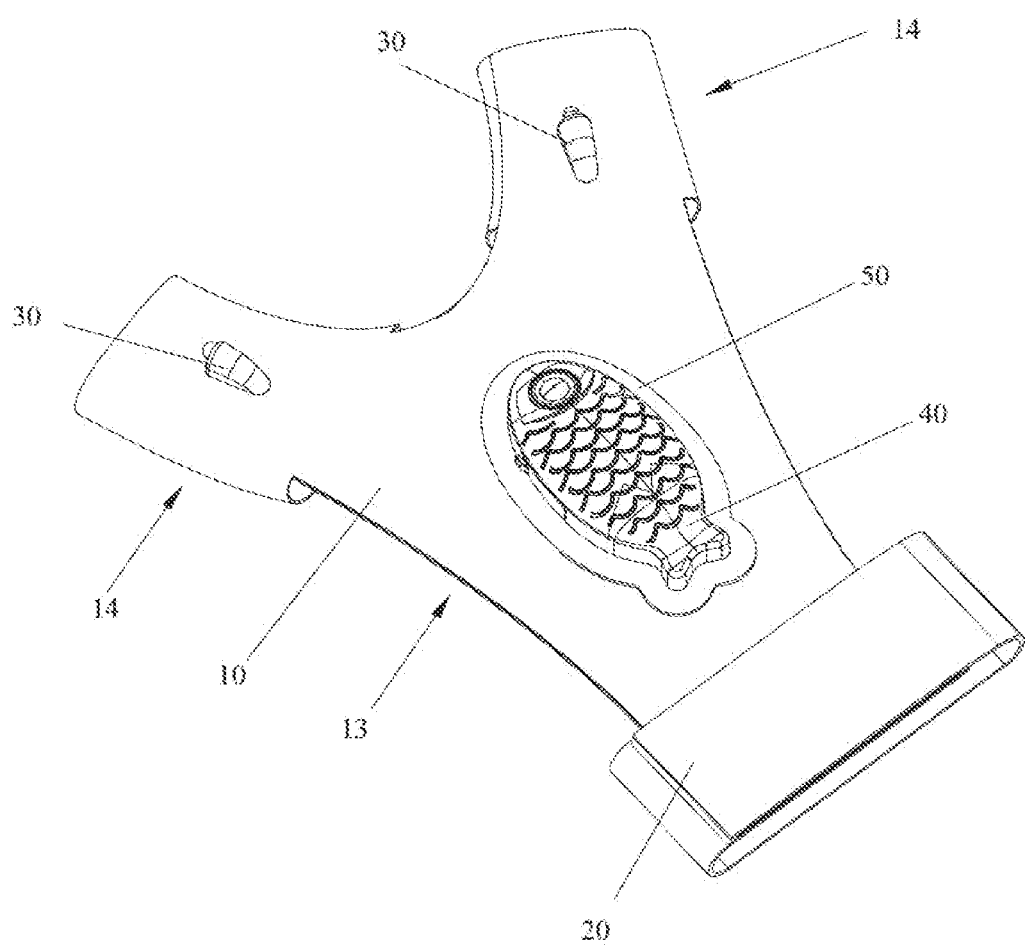
FIG. 1 is a view of a lighting glove according to embodiment one of the present application.

REFERENCE LIST 10 glove body
11 inner protective layer
12 outer protective layer
121 first mounting hole
122 second mounting hole
123 reinforcing portion
13 hand back sleeve
14 finger sleeve
20 wristband portion
21 wristband body
22 magic tape
30 lighting assembly
31 lamp housing
311 second annular recess
32 lamp bead
40 main machine module
41 main machine housing
411 first half housing
412 second half housing
413 first annular recess
414 avoidance hole
42 power supply
43 switch
50 fixing support ring
60 wire

DETAILED DESCRIPTION

The present application is further described below in detail in conjunction with drawings and embodiments. It is to be understood that the embodiments set forth below are intended to merely illustrate and not to limit the present application. Additionally, it is to be noted that for ease of description, only a part, not all, of the structure related to the present application is illustrated in the drawings.

In the description of the present application, unless otherwise expressly specified and limited, the term "connected to each other", "connected", or "fixed" is to be construed in a broad sense, for example, as fixedly connected, detachably connected, or integrated: mechanically connected or electrically connected: directly connected to each other or indirectly connected to each other via an intermediary: or internally connected or interactional between two components. For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the embodiments, it is to be noted that orientations or position relations indicated by terms such as "above", "below", "left", and "right" are based on the drawings. These orientations or position relations are intended only to facilitate the description and simplify an operation and not to indicate or imply that an apparatus or element referred to must have such particular orientations or must be configured or operated in such particular orientations. Thus, these orientations or position relations are not to be construed as limiting the present application. In addition, the terms "first" and "second" are used only to distinguish between descriptions and have no special meaning.

Embodiment One

Figure 2:
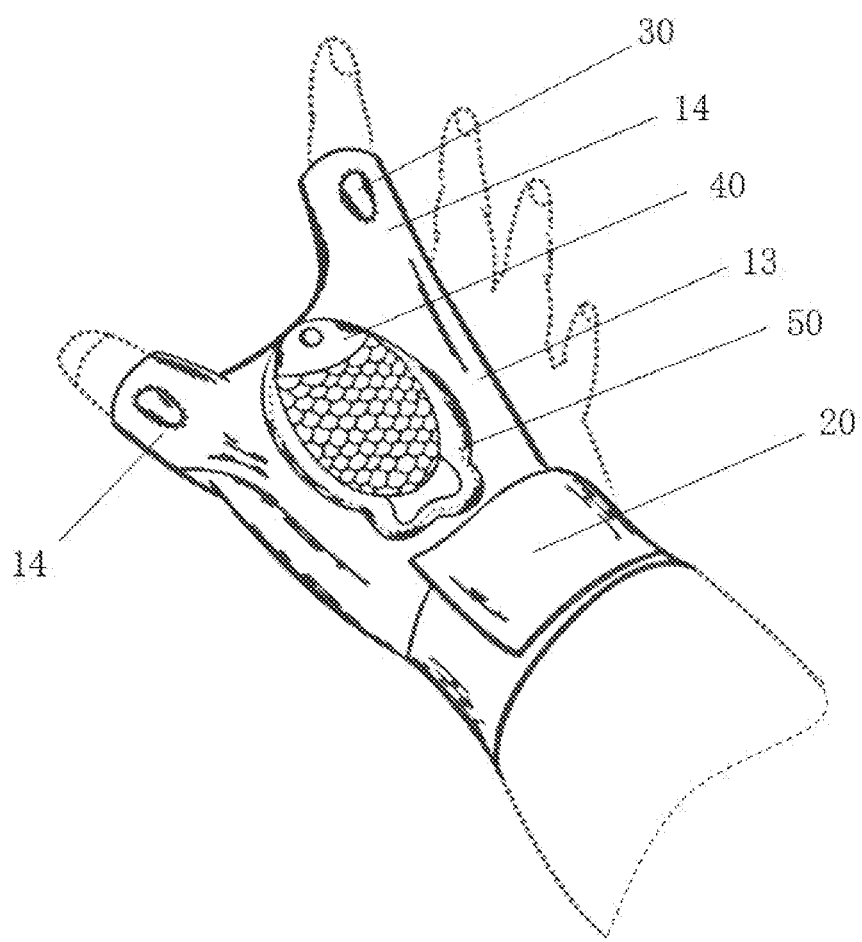
FIG. 2 is a view of a lighting glove worn on a hand according to embodiment one of the present application.

This embodiment provides a lighting glove that can be used in activities requiring hand protection, such as fishing, maintenance, and agricultural labor. As shown in FIG. 1 and FIG. 2, the lighting glove includes a glove body 10 and a wristband portion 20. The glove body 10 is configured to protect the hand of a user. The wristband portion 20 is configured to annularly dispose and fix on the wrist of the user, thereby preventing the lighting glove from falling. The glove body 10 is provided with a hand back sleeve 13 and at least two finger sleeves 14. The hand back sleeve 13 can cover at least part of the back of the hand. As shown in FIG. 2, in this embodiment, the hand back sleeve 13 may cover the area of the back of the hand of the user close to the area between a thumb and an index finger. In other embodiments, the hand back sleeve 13 may also cover the entire back of the hand of the user. The finger sleeves 14 are configured to sleeve fingers of the user. In this embodiment, two finger sleeves 14 are provided. One of the finger sleeves 14 is configured to sleeve on the thumb, another of the finger sleeves 14 is configured to sleeve on the index finger. In other embodiments, the glove body 10 may also be provided with three, four, or five finger sleeves 14. This is not specifically limited herein. Optionally, in this embodiment, the finger sleeves 14 are half-finger sleeves. That is, the ends of the fingers are exposed from the ends of the finger sleeves 14. In other embodiments, the finger sleeves 14 may also be all-finger sleeves. That is, the fingers are completely covered in corresponding finger sleeves 14.

Figure 3:
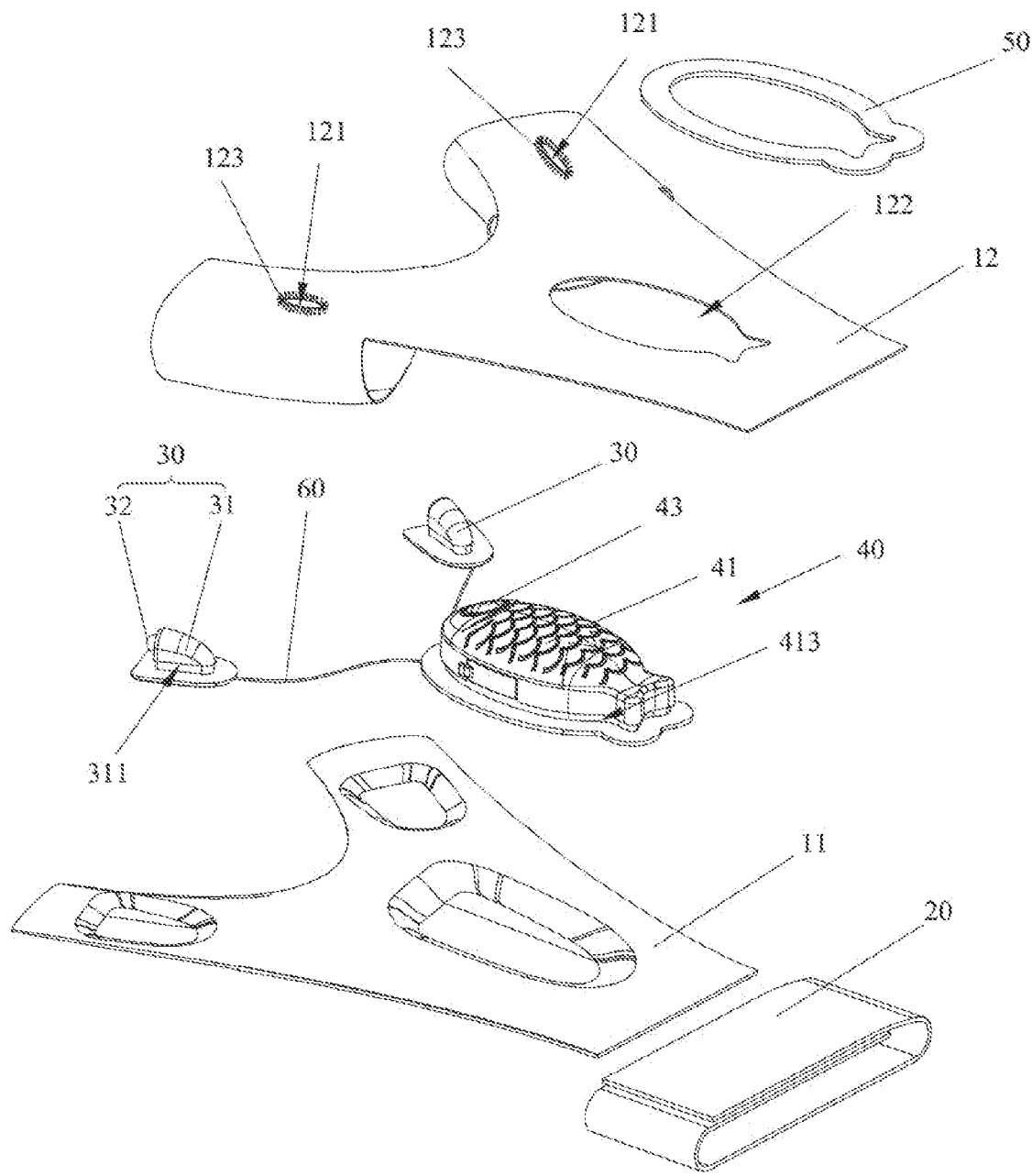
FIG. 3 is an exploded view of a lighting glove according to embodiment one of the present application.

Preferably, as shown in FIG. 1 and FIG. 3, the lighting glove also includes lighting assemblies 30 and a main machine module 40. The main machine module 40 can supply power to the lighting assemblies 30. The lighting assemblies 30 and the main machine module 40 are detachably connected to the glove body 10. Specifically, the glove body 10 includes an inner protective layer 11 and an outer protective layer 12. The inner protective layer 11 and the outer protective layer 12 are stacked and form a receiving space. The lighting assemblies 30 are detachably mounted in the receiving space. At least part of a lighting assembly 30 extends out of the receiving space from a first mounting hole 121 to light the outside of the receiving space. The main machine module 40 is detachably mounted in the receiving space. At least part of the main machine module 40 extends out of the receiving space from a second mounting hole 122 for the user to perform an operation.

According to the lighting glove in this embodiment, the receiving space formed by the inner protective layer 11 and the outer protective layer 12, the first mounting hole 121, and the second mounting hole 122 cooperate. Thus, not only part of the lighting assemblies 30 and part of the main machine module 40 can be covered and protected to improve the aesthetics of the lighting glove, but also the lighting assemblies 30 and the main machine module 40 can be limited. Moreover, the lighting assemblies 30 and the main machine module 40 can be detached from the glove body 10. Therefore, the lighting assemblies 30 and the main machine module 40) can be detached in advance when the lighting glove needs to be cleaned so that damage of the lighting assemblies 30 and the main machine module 40 due to water inflow is avoided, thereby improving the convenience of cleaning the lighting glove.

In this embodiment, the inner protective layer 11 and the outer protective layer 12 can be made of textiles such as cloth. The preceding materials are soft and breathable so that the lighting glove is comfortable to wear. It is to be understood that the inner protective layer 11 and the outer protective layer 12 may be any of the existing materials suitable for manufacturing gloves without departing from the inventive concept of the present application. Optionally, the inner protective layer 11 and the outer protective layer 12 may be connected through bonding or sewing.

As shown in FIG. 3, the lighting assemblies 30 are connected to the main machine module 40 by wires 60. The wires 60 are disposed in the receiving space, thereby improving the aesthetics of the lighting glove. In this embodiment, the lighting glove includes two lighting assemblies 30. The two lighting assemblies 30 are connected to the main machine module 40 by the wires 60.

Figure 4:
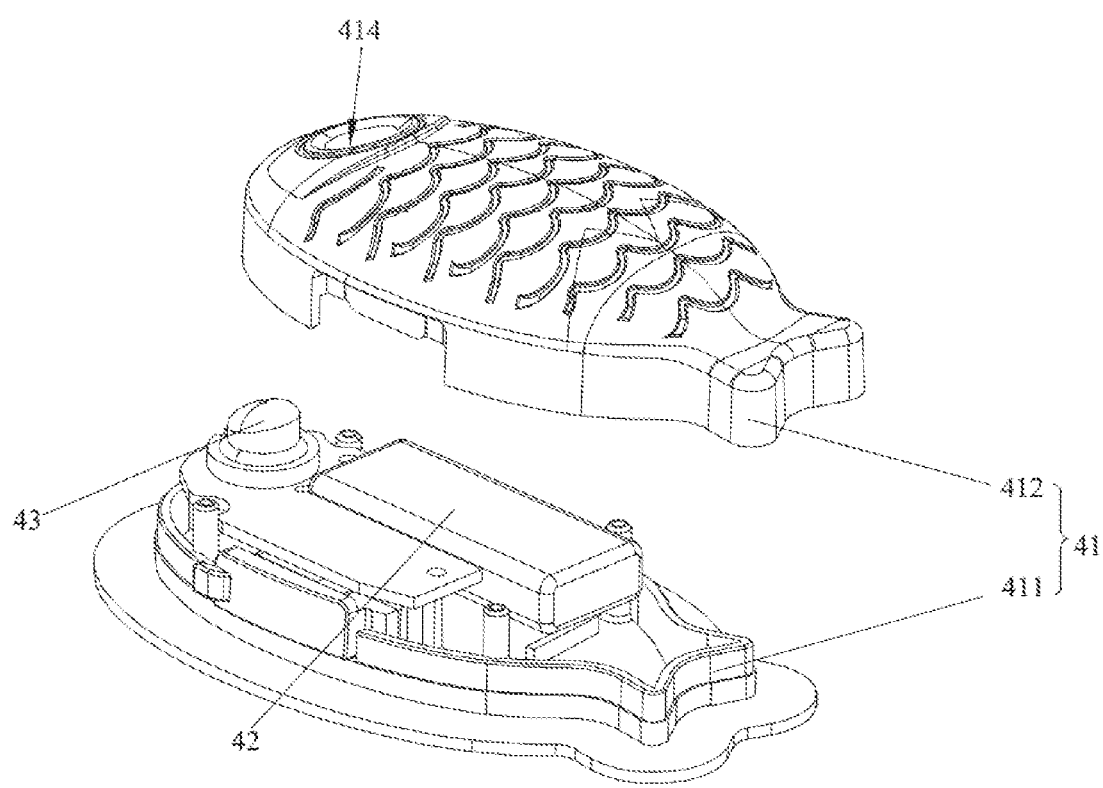
FIG. 4 is a split view of a main machine module according to embodiment one of the present application.
Figure 5:
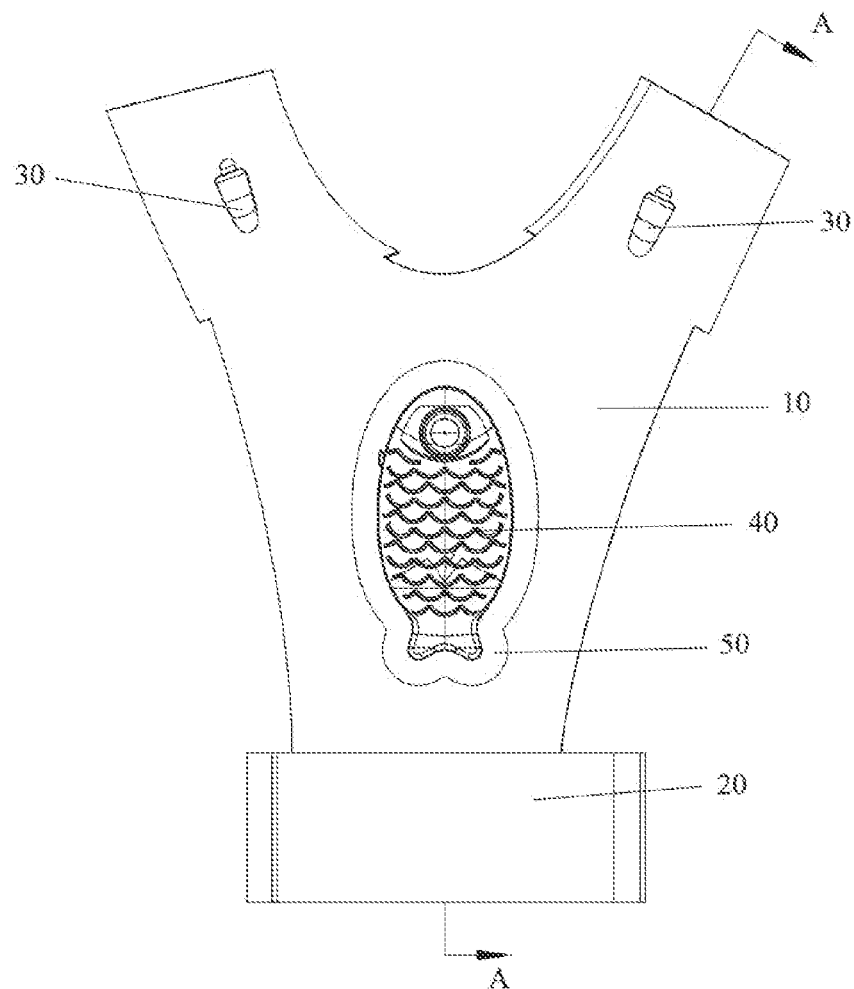
FIG. 5 is a front view of a lighting glove according to embodiment one of the present application.
Figure 6:
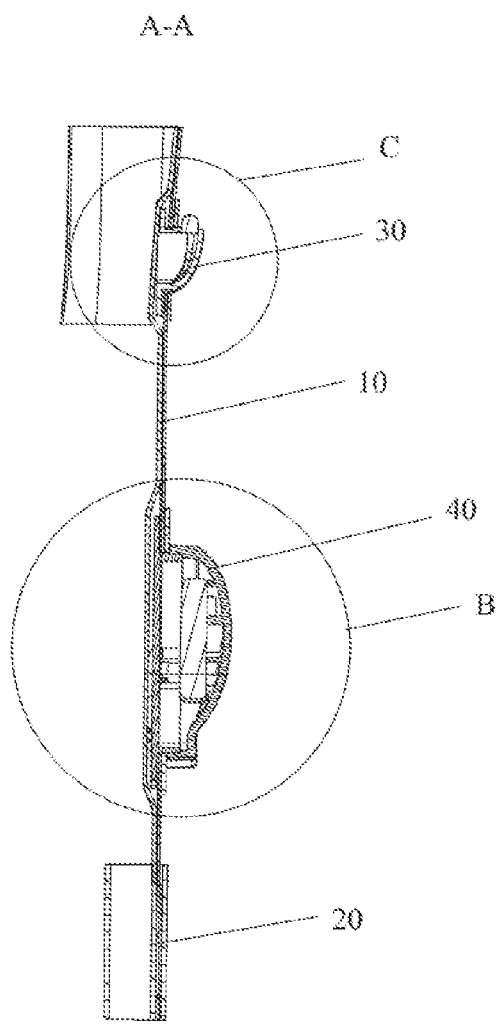
FIG. 6 is a sectional view taken along A-A' in FIG. 5.

As shown in FIG. 3 and FIG. 4, the main machine module 40 includes a main machine housing 41, a power supply 42, and a switch 43. The power supply 42 and the switch 43 are disposed in the main machine housing 41. The power supply 42, the switch 43, and the lighting assemblies 30 are electrically connected in sequence. The switch 43 is configured to turn on or turn off the lighting assemblies 30. As shown in FIG. 4, the main machine housing 41 is provided with an avoidance hole 414. The switch 43 extends from the avoidance hole 414 to the outside of the main machine housing 41, thereby facilitating the operation of the user. Optionally, the power supply 42 may be an ordinary battery or a rechargeable battery. The settings may be selected as desired.

In this embodiment, as shown in FIG. 3, the volume of the main machine module 40 is greater than the volume of a lighting assembly 30. Correspondingly, the area of the second mounting hole 122 is greater than the area of a first mounting hole 121. When mounting the lighting assemblies 30 and the main machine module 40, the lighting assemblies 30 and the main machine module 40 are mounted in the receiving space from the second mounting hole 122. Then, part of the lighting assemblies 30 extends from the first mounting holes 121 to the outside of the lighting glove. Part of the main machine module 40 extends from the second mounting hole 122 to the outside of the lighting glove.

Preferably, as shown in FIGS. 3 and 5 to 7, the lighting glove also includes a fixing support ring 50. The fixing support ring 50 is connected to the outer protective layer 12 and annularly disposed at the second mounting hole 122. The main machine module 40 engages with the fixing support ring 50. Preferably, the fixing support ring 50 has certain elasticity, thereby ensuring that the main machine module 40 can be smoothly mounted in the receiving space. The fixing support ring 50 has certain hardness. Therefore, the fixing support ring 50 can support and limit the main machine module 40, thereby ensuring that the position of the main machine module 40 does not move randomly or fall from the second mounting hole 122, and improving the firmness of the mounting of the main machine module 40.

Preferably, the fixing support ring 50 may be made of a leather material or a rubber material. The fixing support ring 50 made of the preceding material has a certain elasticity deformation capability and a certain strength. Optionally, the fixing support ring 50 may be fixed on the outer protective layer 12 through bonding, sewing, riveting, or the like. In other embodiments, the fixing support ring 50 may also be connected to the outer protective layer 12 by other manners. This is not limited herein.

Figure 7:
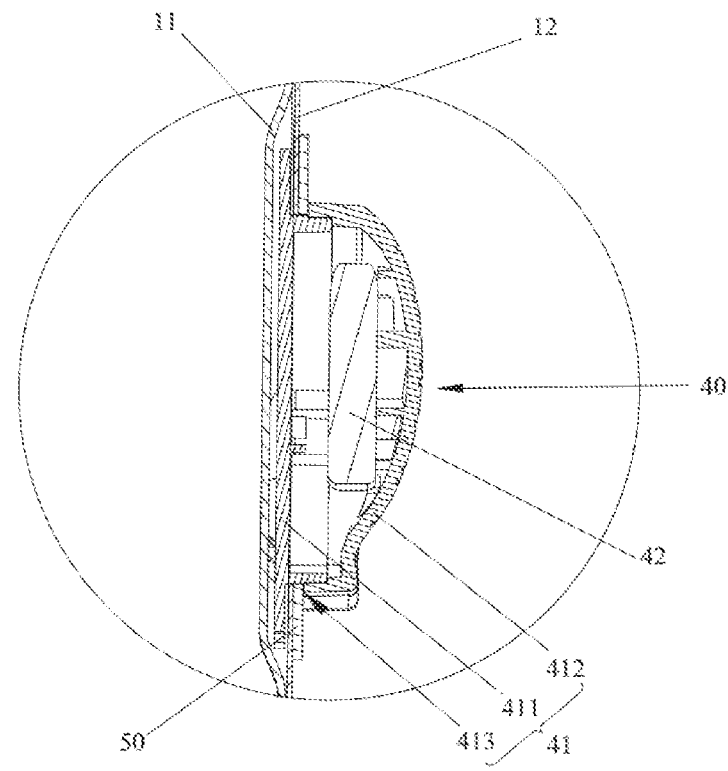
FIG. 7 is an enlarged view of part B in FIG. 6.

In this embodiment, as shown in FIGS. 3, 4, and 7, a first annular recess 413 is formed in an outer wall of the main machine housing 41. The fixing support ring 50 engages in the first annular recess 413. Specifically, the main machine housing 41 includes a first half housing 411 and a second half housing 412. The second half housing 412 is closed on the first half housing 411 to form the first annular recess 413. The first half housing 411 is located inside the receiving space formed by the inner protective layer 11 and the outer protective layer 12. The second half housing 412 is located outside the receiving space. Optionally, in this embodiment, the main machine housing 41 is in the shape of a fish. In other embodiments, the main machine housing 41 may be round, square, or other irregular shape. This is not specifically limited herein.

Figure 8:
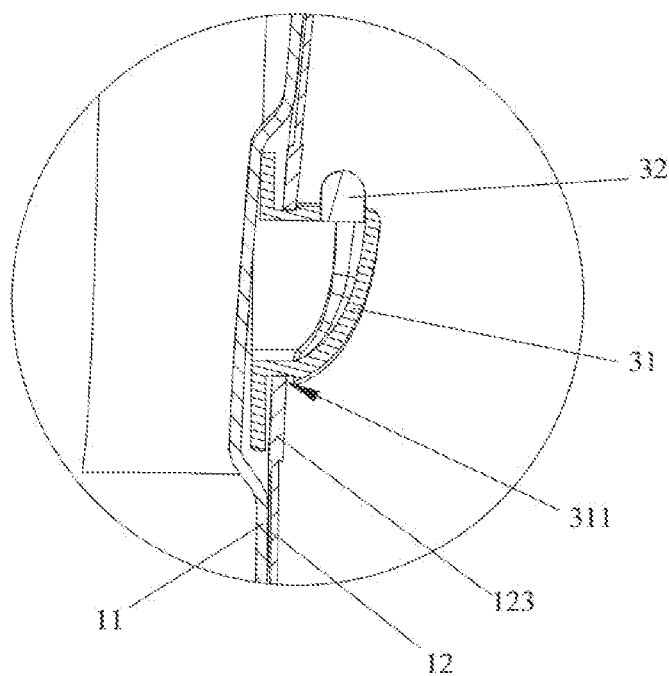
FIG. 8 is an enlarged view of part C in FIG. 6.

Preferably, as shown in FIG. 3 and FIG. 8, the outer protective layer 12 is provided with a reinforcing portion 123 around a first mounting hole 121. A lighting assembly 30 includes a lamp housing 31 and a lamp bead 32. The lamp bead 32 is mounted on the lamp housing 31. The lamp housing 31 is provided with a second annular recess 311. The reinforcing portion 123 engages inside the second annular recess 311. The cooperation of the reinforcing portion 123 with the second annular recess 311 can limit the lighting assemblies 30, thereby preventing the lighting assemblies 30 from shaking randomly and falling into the receiving space, and improving the use experience of the user. Optionally, as shown in FIG. 3, a reinforcing portion 123 in this embodiment can be a buttonhole sewn at a first mounting hole 121. The buttonhole plays a reinforcing role around the first mounting hole 121, thereby reliably limiting a lighting assembly 30. In other embodiments, the corresponding position around the first mounting hole 121 may be reinforced by a manner such as fixing a support member. This is not specifically limited herein.

Figure 9:
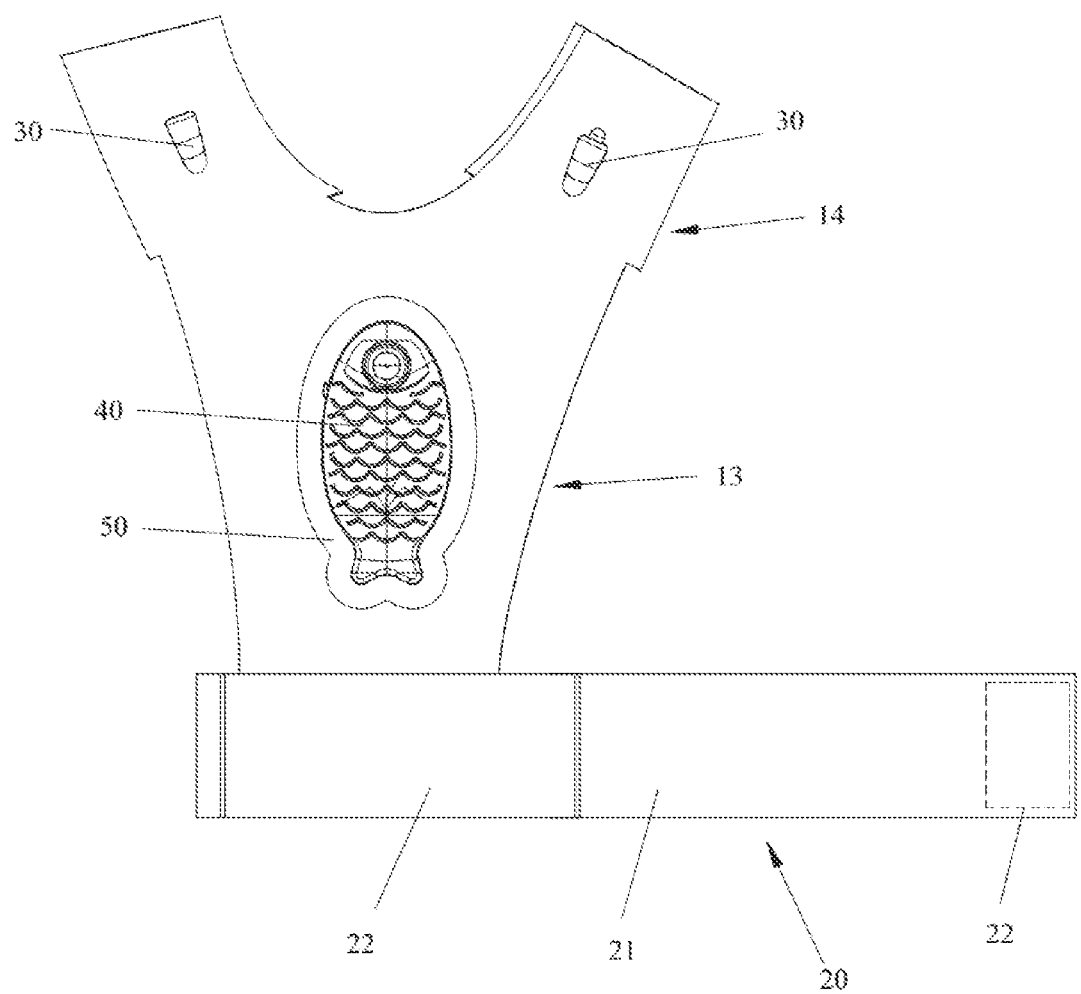
FIG. 9 is a view of a lighting glove when a wristband portion is unfolded according to embodiment one of the present application.

As shown in FIG. 9, the wristband portion 20 is molded with the glove body 10 separately. The wristband portion 20 may be connected to the glove body 10 through any one of bonding, sewing, riveting, or the like. In this embodiment, the wristband portion 20 has an expanded state as shown in FIG. 9 and a closed state as shown in FIG. 1. As shown in FIG. 9, the wristband portion 20 includes a wristband body 21 and magic tapes 22. The wristband body 21 is in the shape of a linear line. The magic tapes 22 are disposed at two ends of the wristband body 21. When the wristband body 21 is wound around the wrist of the user, the magic tapes 22 at two ends of the wristband body 21 are attached to each other so that the wristband portion 20 can be fixed. In this embodiment, the extension direction of the wristband body 21 in the expanded state is approximately perpendicular to the hand back sleeve 13. In other embodiments, the wristband body 21 and the glove body 10 may be disposed at an included angle. This is not specifically limited herein.

Embodiment Two

This embodiment provides a lighting glove. The general structure of the lighting glove in this embodiment is basically the same as the general structure of the lighting glove provided in embodiment one. For the similarities, details are not repeated here. The main difference between the lighting glove in this embodiment and the lighting glove in embodiment one lies in the specific arrangement manner of the wristband body 21. The specific arrangement manner is as follows.

Figure 10:
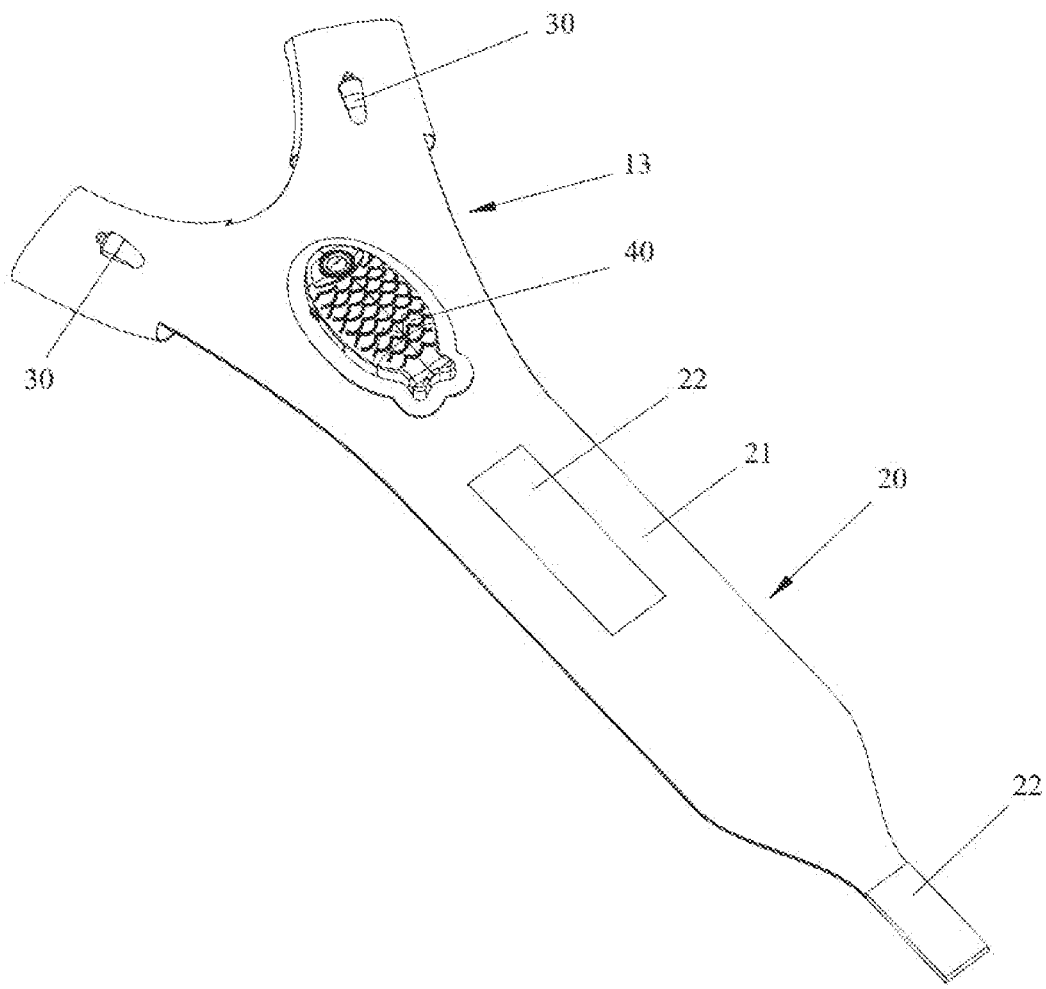
FIG. 10 is a view of a lighting glove according to embodiment two of the present application.

As shown in FIG. 10, in this embodiment, a wristband portion 20 is molded with a glove body 10 integrally. That is, the wristband portion 20 and the glove body 10 can be cut out integrally, thereby facilitating the manufacture of the lighting glove. As shown in FIG. 10, in this embodiment, the wristband portion 20 includes a wristband body 21 and magic tapes 22. The end of the wristband portion 20 facing the glove body 10 and the end of the wristband portion 20 facing away from the glove body 10 are separately provided with a magic tape 22. When the wristband body 21 is wound around the wrist by a user, the magic tapes 22 at two ends are attached to each other so that the wristband portion 20 can be fixed. As shown in FIG. 10, the wristband body 21 and a hand back sleeve 13 are connected and in the shape of a linear line.

Apparently, the preceding embodiments of the present application are merely example embodiments for clearly illustrating the present application and are not intended to limit the implementations of the present application. Those of ordinary skill in the art can make modifications in the embodiments and application scope according to the present application. The content of the specification is not to be construed as limiting the present application. Any modifications, equivalent substitutions, and improvements made within the spirit and principle of the present application fall within the scope of the claims of the present application.

What is claimed is:
1. A lighting glove, comprising:
 a glove body (10) comprising an inner protective layer (11) and an outer protective layer (12) which are stacked and form a receiving space, wherein the outer protective layer (12) is provided with a first mounting hole (121) and a second mounting hole (122);
 a lighting assembly (30) detachably mounted in the receiving space, wherein at least part of the lighting assembly (30) extends out of the receiving space from the first mounting hole (121);
 a main machine module (40) configured to supply power to the lighting assembly (30), wherein the main machine module (40) is detachably mounted in the receiving space, and at least part of the main machine module (40) extends out of the receiving space from the second mounting hole (122); and
 a fixing support ring (50) connected to the outer protective layer (12) and annularly disposed at the second mounting hole (122), wherein the main machine module (40) engages with the fixing support ring (50);

wherein the main machine module (40) comprises a main machine housing (41) and a power supply (42), the power supply (42) is disposed in the main machine housing (41), a first annular recess (413) is formed in an outer wall of the main machine housing (41), and the fixing support ring (50) engages in the first annular recess (413);
wherein the main machine housing (41) comprises a first half housing (411) and a second half housing (412), the second half housing (412) is closed on the first half housing (411) to form the first annular recess (413).

2. The lighting glove according to claim 1, wherein the fixing support ring (50) is made of a leather material or a rubber material.

3. The lighting glove according to claim 1, wherein the fixing support ring (50) is fixed on the outer protective layer (12) through at least one of bonding, sewing, or riveting.

4. The lighting glove according to any one of claim 1, wherein the outer protective layer (12) is provided with a reinforcing portion (123) around the first mounting hole (121), the lighting assembly (30) comprises a lamp housing (31) and a lamp bead (32), the lamp bead (32) is mounted on the lamp housing (31), the lamp housing (31) is provided with a second annular recess (311), and the reinforcing portion (123) engages inside the second annular recess (311).

5. The lighting glove according to claim 1, wherein the reinforcing portion (123) is a buttonhole sewn at the first mounting hole (121).

6. The lighting glove according to any one of claim 1, wherein the glove body (10) is provided with a hand back sleeve (13) and at least two finger sleeves (14), each of the at least two finger sleeves (14) is provided with a first mounting hole (121), the second mounting hole (122) is disposed on the hand back sleeve (13), and each of the at least two finger sleeves (14) is correspondingly provided with one lighting assembly (30).

7. The lighting glove according to any one of claim 1, further comprising a wire (60), wherein the lighting assembly (30) is connected to the main machine module (40) by the wire (60), and the wire (60) is disposed in the receiving space.

8. The lighting glove according to any one of claim 1, further comprising a wristband portion (20), wherein the wristband portion (20) is connected to the glove body (10) and configured to annularly dispose and fix on a wrist of a user; and
 the wristband portion (20) is molded with the glove body (10) integrally or separately.

9. The lighting glove according to claim 1, wherein the main machine module (40) further comprises a switch (43), the switch (43) is electrically connected to the power supply (42) and the lighting assembly (30), and the switch (43) is configured to turn on or turn off the lighting assembly (30).

* * * * *